Sept. 3, 1957 W. J. BAIN 2,805,057
FLANGE BEVELING APPARATUS
Filed Aug. 3, 1953 2 Sheets-Sheet 1

William James Bain
Inventor

By Arthur H. Sturges
Attorney

Sept. 3, 1957   W. J. BAIN   2,805,057
FLANGE BEVELING APPARATUS

Filed Aug. 3, 1953   2 Sheets-Sheet 2

William James Bain
Inventor

Arthur H. Sturges
Attorney

United States Patent Office 2,805,057
Patented Sept. 3, 1957

2,805,057

FLANGE BEVELING APPARATUS

William J. Bain, Casper, Wyo.

Application August 3, 1953, Serial No. 371,968

2 Claims. (Cl. 266—23)

This invention relates to the art of welding and more particularly to treating pipe elbows, tees and the like preparatory to welding pipe line parts together.

It is an object of the invention to provide a device which may be employed for readily providing bevels on the perimeters of pipe line parts, the said device to be comparatively simple, of light weight and readily transportable whereby it may be employed in remote oil field regions where pipe lines are being installed, for transportation of oil therethrough to a refining plant or the like.

Figure 1:
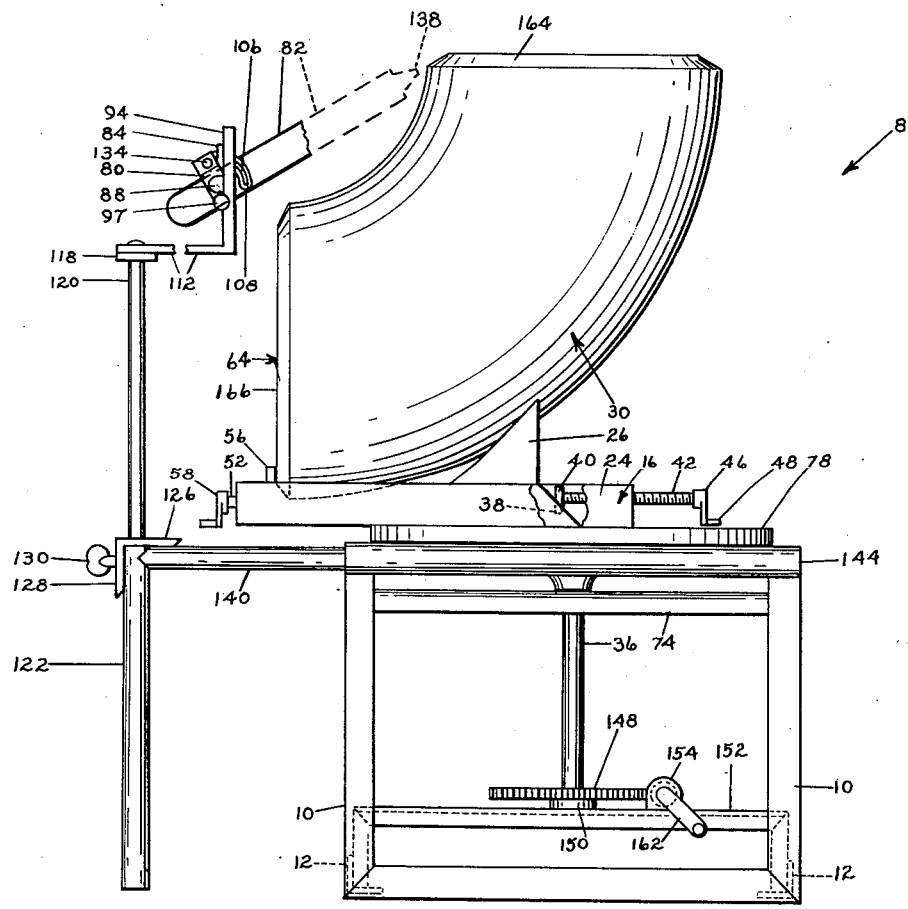
Figure 1 is a side elevation of a beveling machine depicting a preferred embodiment of the invention and showing an elbow undergoing treatment, a cutting torch employed being represented by means of broken lines.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

As heretofore practiced in this art, pipe line parts, such as elbows, tees and the like, after having been used in a pipe line system, have been primarily discarded or sold out as junk after being cut off of a pipe line, and in instances where a pipe line is to be relaid with laterals branching from the pipe line in directions different than initially employed. In instances where the said pipe line parts were not discarded or sold for junk, the said parts were transported from an oil field from which they were derived to a centralized machine shop where the said parts were chucked in lathes for beveling the ends of said parts, whereby the said parts could be re-used. After an employment of a lathe for beveling the said parts, the latter were then re-transported to the oil field at an appreciable cost for labor and transportation, and the instant invention aims to provide a device which may be employed for beveling said ends at their place of re-use and anywhere on the surface of an oil field in lieu of transporting said parts to a machine shop. The new invention further aims to provide a device which eliminates the heretofore expensive method and time required in chucking pipe parts in a lathe by providing a device to which the said pipe line parts may be readily clamped in lieu of said time-consuming chucking in a conventional lathe.

In the accompanying drawings, and in the following specification, the same reference characters are used to designate the same parts and elements throughout and in which the numeral 8 refers to the invention in its entirety.

The new device includes a frame or stand which is rectangular in plan, the corners thereof being supported by means of vertically disposed legs 10.

The lower ends of the legs are preferably joined together by means of horizontally disposed bars 12, said bars being disposed at lower ends of said legs and like bars 14 between the upper ends of said legs whereby a rigid construction is provided. The said bars and legs are welded together or otherwise secured by any suitable means.

Figure 2:
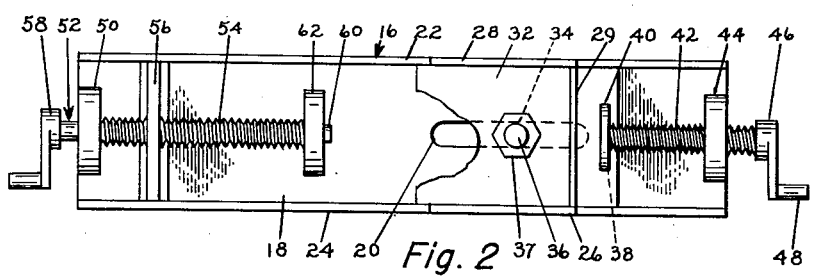
Figure 2 is a top plan view of a cradle employed.

Above the frame a centering or work holding frame or trough generally indicated at 16 is provided. The trough or frame is approximately U-shaped in cross-section having a base with spaced vertically disposed side walls connected with cross members. The bottom portion 18 of the trough is provided with an elongated opening 20 disposed therethrough. Above the oppositely and vertically disposed flanges 22 and 24 of the trough vertically disposed supports 26 and 28 are provided. As best shown in Figure 1, the said supports 26 and 28 are triangular in plan, and as best shown in Figure 2, a transversely disposed brace 29 is employed having its oppositely disposed ends respectively welded to the spaced apart supports 26 and 28, said brace 29 being disposed lower than the apex of the upper ends of said triangular configurations so that a portion of the arcuate surface of the elbow 30 is received between said apexes.

The supports 26 and 28 respectively rest upon the upper edges of the flanges or side rails 22 and 24, said rails or flanges providing the oppositely disposed arms of the said U-shaped trough. The rails 22 and 24 in conjunction with the oppositely disposed supports 26 and 28 provide a cradle for receiving a portion of the elbow 30 therein.

A slidable plate 32 is provided having an aperture 34 disposed therethrough for receiving the threaded upper end of a vertically disposed shaft 36, and secured by a nut 37.

The slidable plate 32 is provided with a slot 38 which receives the outer perimeter of a disc 40 employed. The disc 40 is attached by any suitable means to an end of a threaded shaft 42. The shaft 42 extends through and is threadedly engaged with an upstanding lug 44, the latter being welded or otherwise secured to the bottom 18 of the trough 16. The outwardly disposed end of the shaft 42 is provided with a crank arm 46 the latter having a handle 48 for facilitating a manual rotation of the shaft 42 for causing the disc 40 to move toward or away from the lug 44 complemental to the direction of rotation of the shaft 42. The shaft 42 and adjunct parts are employed during a treatment of elbows of large size. A like lug 50 is suitably secured to the other end of the bottom 18 of the trough 16. A further shaft 52 employed is journaled through the supporting lug 50. The threaded portion 54 of the shaft 52 extends through a transversely disposed slidable tang 56, being in threaded engagement therewith at all times. The wider lower end of the tang 56 is slidably disposed on the upper surface of the bottom 18 of the cradle. The plane portion of the shaft 52 which is journaled through the lug 50 is provided with a crank handle 58 for a manual rotation of the shaft. The threaded end of the shaft 52 terminates in a plane pintle portion 60. The portion 60 is journaled through a support 62, the latter being welded to the upper surface of the bottom 18 of the cradle.

The shaft 52 and its adjunct parts are employed during a treatment of elbows of small size.

As best shown in Figure 1, the tang or abutment 56 extends above the upper edges of the side flanges 22 and 24 of the trough.

During use the elbow 30 is placed in the cradle as shown in Figure 1 with the vertically disposed perimetrical edge thereof against the abutment or tang 56 with the medial portion of the elbow disposed between the triangular supports 26.

By manipulating the crank 58 the abutment 56 is caused to engage the adjacent perimeter of the elbow 30 and to move said elbow toward the cradle portions comprised of the upstanding triangular supports 26 and 28, and by manipulating the crank 58 the operator may cause the end edge 64 of the elbow 30 to be disposed at a true right angle with respect to the bottom 18 of the trough 16. At the time the elbow is positioned as above described, the nut 37 disposed on the threaded upper end 65 of the bolt or shaft 36 is then caused to be tightened by an employment of a suitable wrench for locking the cradle in the selected position with respect to the bottom 18 of the channel iron trough and with respect to the side flanges 22 and 24 of said channel iron.

A portion of the arcuate outer wall of the elbow 30 adjacent the abutment 56 rests upon and between the side flanges 22 and 24, which cooperate with the heretofore mentioned cradle members 26 and 28.

Figure 3:
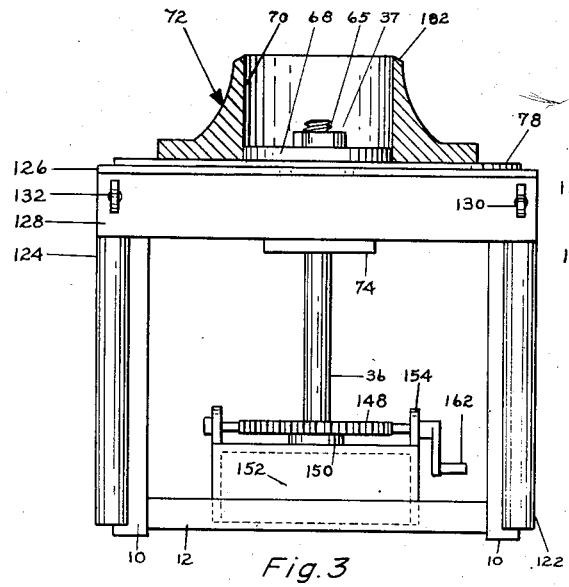
Figure 3 is an end view of the new device, the said torch being omitted therefrom and showing a high pressure flange in cross section mounted thereon preparatory to treating said flange.
Figure 4:
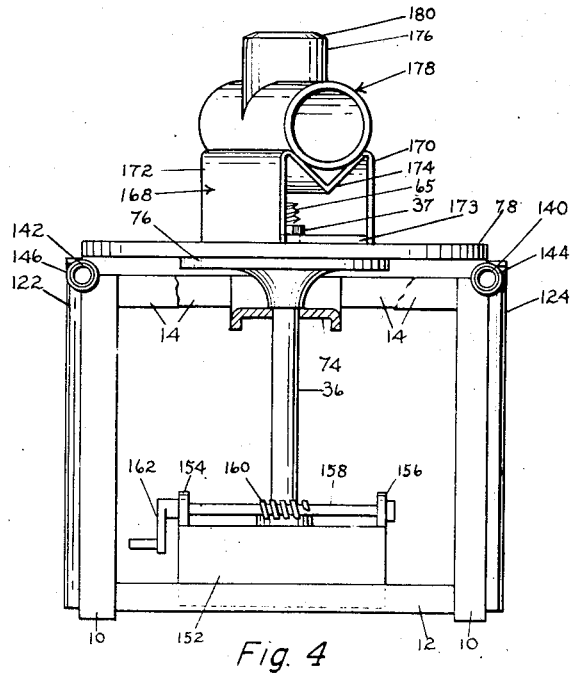
Figure 4 is a view showing the opposite end of the new device with respect to the end thereof shown in Figure 3, the said high pressure flange being omitted from Figure 4, and in lieu thereof a centering gauge chuck is depicted having a pipe tee mounted on said chuck.

As best shown in Figure 3, a centering disc 68 is employed at times when the pipe line part or high pressure flange 72 is to be treated. The annular perimeter of the disc 68 snugly engages the inner annular wall 70 of the said flange 72 for centering the latter on the turn table 78 and axially of the shaft 36. The centering disc 68 is attached to the threaded end of the shaft 36 by means of a removable lock nut 37. As best shown in Figure 4, the shaft 36 is journaled through a stationary horizontally disposed brace bar 74, the latter being secured to and between the upper brace bars 14 of the frame. The upper end of the shaft 36 flares outwardly from its axis for providing an annular platform or support 76 upon which the turn table 78 is disposed.

Figure 5:
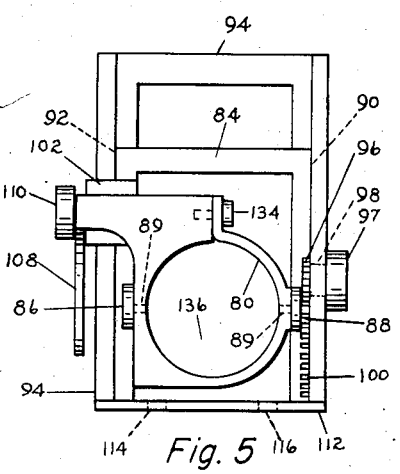
Figure 5 depicts a side view of a bracket device for supporting a cutting torch employed in selected positions.

The new device further includes a clamp 80, best shown in Figure 5, which is employed for holding a cutting torch nozzle 82 in a selected position. The clamp 80 is pivotally mounted on its support or frame 84. Oppositely disposed ears 86 and 88 are formed integral with said support 84, and like pivot pins 89 extend respectively from the ears 86 and 88 into opposite sides of the clamp, said pivot pins being represented by means of broken lines in Figure 5. The clamp 80 is sildable in a vertical direction, since the side edges of the frame or support 84 which carries the clamp is slidably disposed between the track guides 90 and 92 of the track bracket 94 employed.

The bracket 94 carries a sprocket wheel 96 which may be rotated manually by an employment of a knob 97 secured upon a shaft 98 to which the sprocket 96 is also secured. The sprocket wheel 96 is rotated by the knob 97 for moving the frame 84 up or down, as may be desired, since the teeth of the sprocket wheel 96 engage the notches 100 carried by the adjacent leg of the frame 84. The said spaced apart notches are arranged longitudinally with respect to the said leg of the frame 84 and function similar to a rack-bar in conjunction with the sprocket wheel 96.

Figure 6:
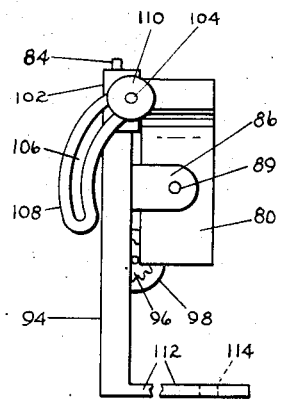
Figure 6 is an end view of the parts shown in Figure 5.

A friction clamp 102 is attached to that leg of the frame member 84 which is oppositely disposed with respect to the leg thereof which carries the rack bar notches 100. The friction clamp 102 engages the adjacent leg of the bracket 94, said leg being provided with the said track guide 92. The threaded end of a lock screw 104 which is rotated by a knob 110 engages with the friction clamp or plate 102 at times locking the frame 84 in adjusted positions in the frame 94. The lock screw 104 is best shown in Figure 6.

The lock screw 104 is attached to the friction clamp 102 and extends through the slot 106 of a sector bar 108, which extends from the hub at the upper end of the clamp 80 for securing the clamp with a cutting torch nozzle thereon in adjusted positions.

A knob 110 employed is rigidly attached to one end of the lock screw 104.

During use, the knob 110 becomes compacted, at times, against the outwardly disposed surface of the slotted sector 108. As best shown in Figure 6, the slot 106 is arcuate in plan since the torch holder clamp 80 swings on its pivot pins 89.

As shown in Figure 6, the heretofore mentioned clamp 80 is depicted in an upwardly disposed position and as distinguished from the down position thereof shown in Figure 5 with respect to its support.

The said clamp device further includes a foot 112 which is disposed at a right angle with respect to the bracket 94, said foot being provided with two spaced apart apertures 114 and 116 for facilitating an attachment of said foot to a support bar 118 carried by and between two like spaced apart standards or supports 120 for the cutting torch nozzle 82, as best shown in Figure 1.

The lower ends of the standards 120 are telescopically and slidably received respectively in vertically disposed pipe guides 122 and 124.

The said standards 120 extend through the horizontally disposed arm 126 of a length of angle iron, the other arm of the latter, indicated at 128, being vertically disposed, said angle iron being welded to the upper ends of the leg pipes 122 and 124. A banjo key set screw 130 is threadedly secured to the arm 128 and extends through the pipe 122 for anchoring the standard 120 in a selected position and a like banjo key 132 is extended through the wall of the pipe 124.

It will be seen that the cutting torch nozzle 82 may be raised or lowered and locked in the selected position with respect to the arm 126 of said angle iron bar by manipulating the banjo key set screws 130 and 132 and that a selected angle of inclination, as may be desired, may be provided for said nozzle 82 complemental to the bevel desired on the work, such as the end 164 of the elbow 30 or the end 180 of the tee 178 or the end 182 of the flange 72, by means of an employment of the knob 110, and after the torch nozzle 82 has been locked to the clamp 80 by means of a screw 134 shown in Figure 5, since said nozzle in cross-section is circular and snugly fits the clamp 80 at the time the latter is closed about the nozzle by means of the said screw 134.

The outlet end of the nozzle 82 is indicated at 138. The other end of the nozzle is attached to a conventional flexible conduit which is in communication with the source of supply of cutting torch gas contained within a tank or the like not shown.

Two horizontally disposed telescoping rails formed with lengths of pipe or rods 140 and 142 are respectively welded to the pipe guides or vertically disposed legs 122 and 124, being disposed at a right angle with respect to said legs.

The horizontally disposed pipe 140 is telescopically and slidably disposed in a guide pipe 144, the latter being welded to the outer side of the frame. The guide pipe 146 is similarly welded to the opposite side of said frame for slidably receiving therein the pipe 142. Since the pipes 140 and 142 may be pushed or pulled in a horizontal direction the vertically disposed pipe guides or legs 122 and 124 may be moved selectively toward or away from the frame of the machine for positioning the outlet end of the nozzle 82 toward or away from the work, as may be desired. The lower ends of the vertically disposed pipe guides or legs 122 and 124 rest upon the ground during use.

The lower end portion of the shaft 36 is splined or otherwise suitably secured to a driven gear 148, the latter having a hub or annular flange 150, which rests upon a support 152. The pintle and lower end of the shaft 36 is journaled in the upper surface of said support 152, said support being employed for elevating the crank handle 162 above the soil.

Upon the upper surface of the support 152 oppositely disposed ears 154 and 156 are welded thereto. A horizontally disposed shaft 158 is journaled through the said ears. A medial portion of the shaft 158 is provided with a worm thread or pinion 160 which is in constant engagement with the teeth of the gear 148. An end of the shaft 158 is provided with the said crank handle 162. By manipulating the crank handle 162 in either direction a rotary movement is imparted to the shaft 158 correspondingly and to the pinion 148 for driving the vertically disposed shaft 36, the turn table 78, the trough or clamping assembly 16 and the work attached to the assembly 16 for causing said work to rotate slowly in a horizontal direction while a bevel edge is cut on said work by the torch 82.

Referring to Figure 1, the elbow 30 has been provided with a beveled end 164 and a like beveled surface, as indicated at 166 is provided at its other end. By adjusting the heretofore described mechanism, said bevels 164 or 166 may be a 45 degree bevel, such as is conventionally employed, or any other degree of bevel, obtuse or acute, as may be desired, at either end of the elbow 30 suitable to the pipe line part to which the elbow 30 is later to be welded.

Referring to Figure 4, the upper end of the shaft 36, provided with the screw thread 65, is engaged with a nut 37, shown in Figures 2 and 3. The nut 37 may be employed for locking the work to the turn table, such as the flange 72 shown in Figure 3, or the cradle for holding the elbows, as shown in Figures 1 and 2, or the centering chuck 168, as shown in Figure 4.

The centering chuck 168 is hollow between the sides 170 and 172 thereof. The lower ends of the sides are attached to a transversely disposed plate 173, the latter being provided with a medially disposed aperture through which the threaded end 65 of the shaft 36 extends. During use of the centering device or chuck 168, the nut 37 is inserted through the open end of the chuck and applied to the thread 65 of the shaft 36, and said nut is seated by means of a wrench whereby the chuck 168 is axially disposed with respect to the shaft 36 and locked to the turn table.

The chuck 168 further includes a transversely disposed web 174 which is inverted V-shape in cross section for providing a trough within which the tee 178 is received at times when a tee is to be provided with a beveled edge by the mechanism of the instant invention. The upper ends of the oppositely disposed sides 170 and 172 of the chuck are formed integral with the web 174. During use the main body portion of the tee 178 rests in the trough of the chuck, and the operator positions the tee so that the arm 176 thereof is axially disposed with respect to the shaft 36. If desired, the tee 178 may be attached to the chuck by means of suitable clamps not shown.

It will be seen that at times when the T 178 is mounted on the chuck, as above described, that the beveled edge 180 of the arm 176 of the T may be formed by means of the above described mechanism.

Similarly a beveled edge, such as the edge 182, may be provided for the high pressure flange 72 at times when it is assembled with the new mechanism, as shown in Figure 3.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice if desired.

Having now described the invention that which is claimed to be new and desired to be procured by Letters Patent is:

1. In a weld fitting cutting machine, the combination which comprises a stand including spaced parallel vertically disposed rectangular-shaped frames having tubular rails at upper ends thereof, cross bars connecting upper and lower ends of the frames, a centrally positioned longitudinally disposed brace bar connecting the cross bars at the upper end of the stand, and a support carried by cross bars in the lower part of the stand, a vertically disposed centrally positioned shaft rotatably mounted in the support and brace bar, a platform on the upper end of the shaft, a turntable on the platform, a work holding frame including side walls connected with cross members bolted to the turntable, threaded shafts having work engaging elements thereon and having crank handles on extended ends positioned in the ends of the work holding frame, a gear on the lower end of the shaft, a manually actuated pinion positioned in meshing relation with the gear for rotating the shaft and turntable, telescoping rods slidably mounted in the tubular rails at the upper ends of the rectangular-shaped frames and having vertically disposed tubular guides depending from extended ends thereof, vertically disposed standards connected at the upper ends with a support bar mounted in said guides, and means for adjustably supporting a cutting torch nozzle on said support bar.

2. In a weld fitting cutting machine, the combination which comprises a stand including spaced vertically disposed rectangular-shaped frames having tubular rails on upper ends thereof and connected with cross bars, a brace bar in the upper part of the stand, a support in the lower part of the stand, a vertically disposed shaft rotatably mounted in the brace bar and support, a platform on the upper end of the shaft, a turntable on the platform, a work holding element adapted to be positioned on the turntable, a gear on the lower end of the shaft, a manually actuated pinion positioned in meshing relation with the gear for rotating the shaft and turntable, telescoping rods slidably mounted in the tubular rails on the upper ends of the rectangular-shaped frames and having tubular guides depending from extended ends thereof, vertically disposed standards connected at the upper ends with a support bar mounted in said guides, a vertically disposed frame having spaced side rails mounted on the support bar, a cutting torch carrying frame adjustably mounted in the vertically disposed frame, a cutting torch nozzle retaining clamp pivotally mounted in said cutting torch carrying frame, a sector having an arcuate slot therein extended from the clamp, and a lock screw extended through the slot of the sector for securing the cutting torch carrying frame and clamp in adjusted poistions.

References Cited in the file of this patent

UNITED STATES PATENTS

| | | |
|---|---|---|
| 1,858,078 | Douglass et al. | May 10, 1932 |
| 2,057,612 | Formont | Oct. 13, 1936 |
| 2,383,607 | Lovers et al. | Aug. 28, 1945 |
| 2,384,128 | Nation | Sept. 4, 1945 |
| 2,389,463 | Smotzer | Nov. 20, 1945 |
| 2,652,243 | Reed | Sept. 15, 1953 |
| 2,734,737 | Scardina | Feb. 14, 1956 |

FOREIGN PATENTS

| | | |
|---|---|---|
| 412,788 | Germany | Apr. 27, 1925 |